United States Patent [19]

Funathu

[11] Patent Number: 5,062,698
[45] Date of Patent: Nov. 5, 1991

[54] FOCUSING DEVICE FOR A BINOCULAR INSTRUMENT

[75] Inventor: Gouzi Funathu, Tokyo, Japan

[73] Assignee: Asahi Kogaku Kogyo K.K., Tokyo, Japan

[21] Appl. No.: 646,443

[22] Filed: Jan. 25, 1991

Related U.S. Application Data

[63] Continuation of Ser. No. 381,542, Jul. 19, 1989, abandoned.

[30] Foreign Application Priority Data

| Jul. 21, 1988 | [JP] | Japan | 63-183151 |
| Jul. 21, 1988 | [JP] | Japan | 63-183152 |
| Jul. 21, 1988 | [JP] | Japan | 63-183153 |

[51] Int. Cl.$^5$ .......................... G02B 7/06; G02B 23/18
[52] U.S. Cl. ........................................ 359/414; 359/418
[58] Field of Search ............... 350/556, 555, 554, 553, 350/552, 551, 514, 550

[56] References Cited

U.S. PATENT DOCUMENTS

| 1,479,409 | 1/1924 | Edstrom | 350/552 |
| 2,079,890 | 5/1937 | Wollensak et al. | 350/551 |
| 2,267,711 | 12/1941 | Bailey | 350/552 |
| 2,386,394 | 10/1945 | Grier | 350/552 |
| 3,528,724 | 9/1970 | Bertin | 350/551 |
| 3,540,792 | 11/1970 | Akin, Jr. | 350/552 |
| 3,712,704 | 1/1973 | Sato | 350/554 |
| 4,818,086 | 4/1989 | Moore | 350/552 |
| 4,867,533 | 9/1989 | Akin, Jr. | 350/552 |

Primary Examiner—Bruce Y. Arnold
Assistant Examiner—James Phan
Attorney, Agent, or Firm—Sughrue, Mion, Zinn Macpeak & Seas

[57] ABSTRACT

A focusing device for a binocular instrument can include a single focusing drive means provided between right and left ocular lenses so as to simutaneously move the right and left ocular lenses forward and backward in a direction of an optical axis to effect focusing. The focusing device also includes a pair of right and left guide holes formed in a body of the binocular instrument which extend from the ocular side to the portion of the binocular body accommodating Porro prisms or Porro mirrors. The guide holes extend in coaxial relation to respective ocular optical axes. A pair of right and left ocular tubes respectively support the ocular lenses and are received respectively in the guide holes so as to be slidable along the respective ocular optical axes. A connecting means connects each of the ocular tubes to the focusing drive means.

11 Claims, 3 Drawing Sheets 5,062,698

FOCUSING DEVICE FOR A BINOCULAR INSTRUMENT

This is a continuation of application Ser. No. 07/381,542 filed July 19, 1989, now abandoned.

BACKGROUND OF THE INVENTION

This invention relates to a focusing device for a binocular instrument and more particularly to such a focusing device of the type in which right and left ocular lenses are moved forward and backward at the same time by a single focusing drive means. provided between the right and left ocular lenses. so as to achieve focusing. FIG. 6 shows a binocular instrument which includes a body 60 which can be flexed or bent about a central hinge 59. A pair of right and left arms 51a and 51b. which are commonly referred to as "wings", are connected respectively to ocular tubes 52a and 52b. A threaded rod 53 is connected to a joint between the pair of arms 51a and 51b. The arms 51a and 51b, the ocular tubes 52a and 52b, and the threaded rod 53 jointly constitute an ocular unit 50. Reference numerals 54a and 54b denote right and left ocular lenses, respectively. The pair of right and left arms 51a and 51b are angularly movable about the threaded rod 53 relative to each other.

A rotatable wheel 55 constituting a focusing drive means is mounted on the hinge 59 of the binocular body 60, and the rotatable wheel 55 is threaded on the threaded rod 53. By rotating the rotatable wheel 55. the ocular tubes 52a and 52b are moved forward and backward through the pair of arms 51a and 51b in the direction of the optical axis so as to achieve focusing.

As described above. the ocular unit 50 is supported at its central portion on the binocular body 60 through the threaded rod 53. One end of the two ocular tubes 52a and 52b are fitted respectively on annular engaging portions 56a and 56b formed on the ocular side of the binocular body 60, thus supporting the opposite ends of the ocular unit 50 on the binocular body 60.

That portion of each ocular tube 52a and 52b extending rearwardly from the backside of the arm 51a and 51b is fitted on the engaging portion 56a and 56b, respectively. When such a fitting portion (i.e.. area of engagement) of the ocular tubes 52a and 52b is made relatively long, the ocular portion projects considerably from the binocular body 60, which increases the size of the binocular instrument. Therefore, it is difficult to make the fitting portion long, and as a result the opposite ends of the ocular unit 50 connected to the binocular body 60 are slightly moved, due to a backlash, as indicated by arrows A (FIG. 6) on the central threaded rod 53 which in this case serves as a fulcrum. Therefore, when the user's face contacts the ocular portion during use of the binocular instrument, the ocular lenses 54a and 54b are moved, thus failing to obtain a good view of an object.

Further, the distance between the hinge 59 and the engaging portions 56a and 56b inevitably varies from one product to another. Therefore, if there is no degree of freedom in the distance B between the threaded rod 53 and each ocular tube 52a and 52b, it is possible that the fitting portion of the ocular tubes 52a and 52b may not be properly fitted on the engaging portions 56a and 56b when the threaded rod 53 is threaded into the rotatable wheel 55, thus failing to effectively mount the ocular unit 50 on the binocular body 60.

To deal with this problem, the right and left arms 51a and 51b can be loosely connected to the threaded rod 53 so that the former can slightly move with respect to the latter. With this arrangement, the distance B between the threaded rod 53 and the ocular tubes 52a and 52b can be varied in an amount corresponding to such play.

However, when the arm 51a or 51b to which the ocular tube 52a or 52b is connected has such a play, the ocular lens 54a and 54b is moved or displaced when it comes into contact with the user's face during use of the binocular instrument, thus failing to obtain a good view of an object.

Further, in the above focusing device for a binocular instrument. the ocular unit 50 is provided exterior to the binocular body 60 and hence is exposed to the exterior Therefore foreign matters such as dirt, dust and sand tend to deposit on the operating portion which achieves focusing, causing improper operation. Also. the operating portion can be easily damaged or broken when subjected to an impact such as when the binocular instrument is dropped, thus causing a malfunction.

SUMMARY OF THE INVENTION

In view of the above deficiencies, it is an object of the present invention to provide a focusing device for a binocular instrument in which an ocular portion is not subjected to movement due to a backlash, thereby ensuring that a good view of an object can be obtained in a stable manner without increasing the size of the binocular instrument.

Another object is to provide such a focusing device in which ocular lenses are not moved or displaced even when an external force is applied to the ocular portion, thereby ensuring that a good view of an object can be obtained in a stable manner.

A further object is to provide such a focusing device which has excellent durability.

According to a first aspect of the present invention, a focusing device for a binocular instrument is provided with a pair of right and left Porro prisms or Porro mirrors mounted within a body of the binocular instrument, a pair of right and left ocular lenses, and a pair of right and left objective lenses. The Porro prisms or Porro mirrors are disposed respectively between the right ocular lens and the right objective lens and between the left ocular lens and the left objective lens. The focusing device includes a single focusing drive means provided between the right and left ocular lenses so as to simultaneously move the right and left ocular lenses forward and backward in a direction of an optical axis to effect focusing.

Additionally, a pair of right and left guide holes are formed in the body of the binocular instrument which extends from the ocular side to the portion of the binocular body which accommodates the Porro prisms or Porro mirrors. The guide holes extend coaxially in relation to respective ocular optical axes. A pair of right and left ocular tubes respectively support the ocular lenses and are received respectively in the guide holes such that they are slidable along the respective ocular optical axes. A connecting means connects each of the ocular tubes to the focusing drive means.

That portion of the ocular tube which would interfere with the Porro prisms or Porro mirrors may be removed. At least one of the right and left ocular tubes has a diopter difference adjusting means for moving the ocular lens, supported by the one ocular tube, forward and backward in the direction of the optical axis.

Since the ocular tubes are fitted respectively in the guide holes formed in the body of the binocular instrument and extend from the ocular side to that portion of the binocular body accommodating the Porro prisms or Porro mirrors, the area of engagement (fitting) between the ocular tube and the guide hole can be sufficiently long.

Further, by removing that portion of the ocular tube which would interfere with the Porro prism or the Porro mirror, the ocular tube will not be brought into contact with the Porro prism or the Porro mirror, so that the above engagement area can be sufficiently long.

According to a second aspect of the present invention, a single focusing drive means is provided between right and left ocular tubes which respectively support ocular lenses, so that the ocular tubes are simultaneously moved forward and backward in a direction of an optical axis to effect focusing. The focusing drive means and each of the ocular tubes have respective connecting portions projecting from their sides in overlapping relation to each other. The two connecting portions are fastened together by a screw and have a rotation prevention means for preventing the two connecting portions from moving relative to each other in a direction of rotation of the screw.

One of the two connecting portions may have a groove formed therein which extends in the direction of projection of the one connecting portion. The other connecting portion has a protuberance formed thereon which is received in the groove. The groove and protuberance jointly provide a means for preventing rotation.

Thus, the connecting portions projecting respectively from the focusing drive means and the ocular tube are fastened together by the screw in overlapping relation. Thus, the connecting portions can be readily fixed to each other even when their relative position is slightly varied. Therefore, even when there is a variation in the distance between the focusing drive means and the ocular tube their connecting portions can be adjustably fastened together by the screw to compensate for such a variation, thereby firmly connecting them together without any play or backlash.

When the screw is being tightened, the rotation prevention means prevents relative movement between the two connecting portions so that the connecting portions are not rotated in response to the tightening. Therefore, the connecting portions are fixedly connected together in such a manner that they are oriented in a predetermined direction and are maintained in a predetermined position.

According to a third aspect of the present invention, a binocular body is provided which can be flexed about a central hinge so as to vary the distance between a pair of right and left ocular lenses provided respectively at the right and left side portions of the binocular body. The focusing device comprises a single focusing drive means mounted on the hinge so as to simultaneously move the right and left ocular lens forward and backward in a direction of an optical axis to effect focusing. A pair of guide holes is formed in the binocular body which extends coaxially with the ocular optical axes, respectively. A pair of right and left ocular tubes, respectively supporting the right and left ocular lenses, is received respectively in the two guide holes so as to be movable forward and backward in the direction of the optical axis. A pair of right and left connecting means is provided which connects said focusing drive means to the right and left ocular tubes, respectively. The two connecting means are mounted within the binocular body and are angularly movable relative to each other about the hinge.

Thus, the pair of right and left connecting means connects the focusing drive means to the right and left ocular tubes respectively, and the focusing drive means is operable to simultaneously move the right and left ocular tubes forward and backward in the directions of the respective ocular optical axes to thereby achieve focusing.

The right and left connecting means are angularly movable relative to each other about the hinge, so that each can be angularly moved when the binocular body is flexed to adjust the distance between the right and left ocular lenses.

The right and left connecting means are accommodated within the binocular body and are not ever exposed to the exterior.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENT

The present invention will now be described with reference to the drawings.

Figure 3:
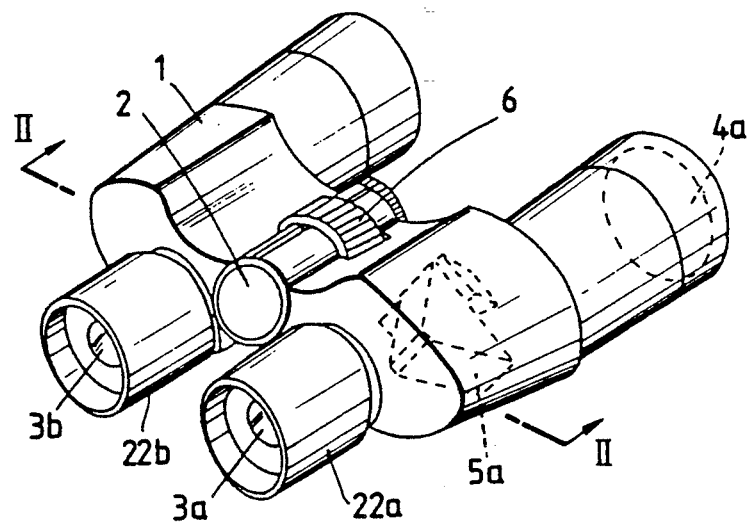
FIG. 3 is a perspective view of the binocular instrument.

FIG. 3 is a perspective view showing the overall construction of a binocular instrument according to the present invention. The body 1 of the binocular instrument is symmetrical with respect to a central hinge 2. Ocular lenses 3a and 3b, a pair of objective lenses 4a and 4b and a pair of Porro prisms 5a and 5b are provided at the right and left side portions of the binocular body. respectively (objective lens 4b and Porro prism 5b are not shown). The Porro prism 5a is disposed between the ocular lens 3a and the objective lens 4a. The Porro prisms 5a and 5b may be replaced by Porro mirrors. The binocular body 1 can be angularly moved or flexed at its center about the hinge 2 so that the distance between the right and left ocular lenses can be suitably varied By rotating a rotatable wheel 6 mounted on the hinge 2, the right and left ocular lenses 3a and 3b are simultaneously moved forward and backward in the direction of the optical axis to achieve focusing By rotating one of the two eyecups 22a and 22b (for example. the right eyecup, 22a), the ocular lens 3a therein is moved forward and backward in the direction of the optical axis so that a difference between the right and left diopters is adjusted.

Figure 1:
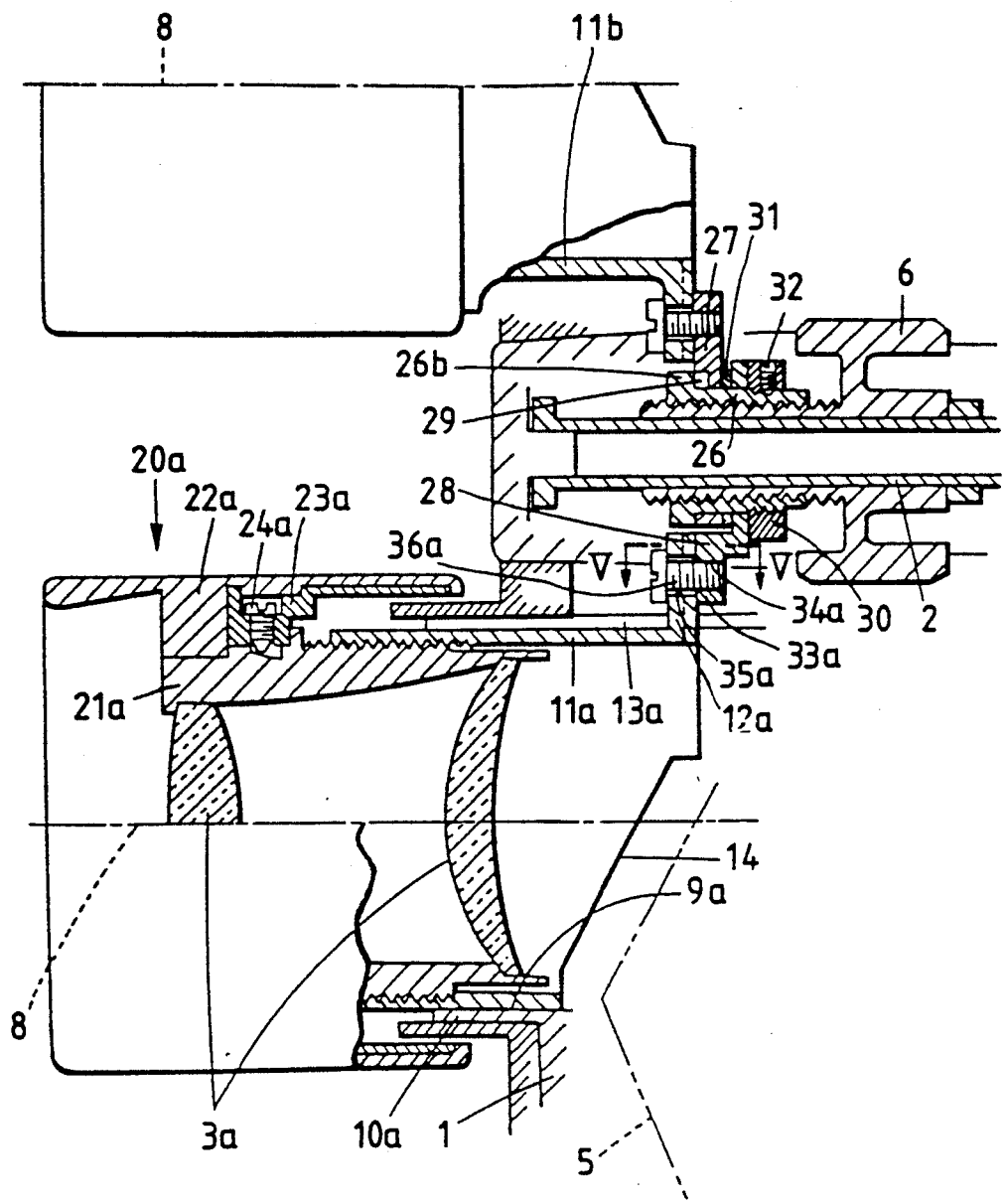
FIG. 1 is a cross-sectional view of a portion of a binocular instrument incorporating a focusing device provided in accordance with the present invention.
Figure 2:
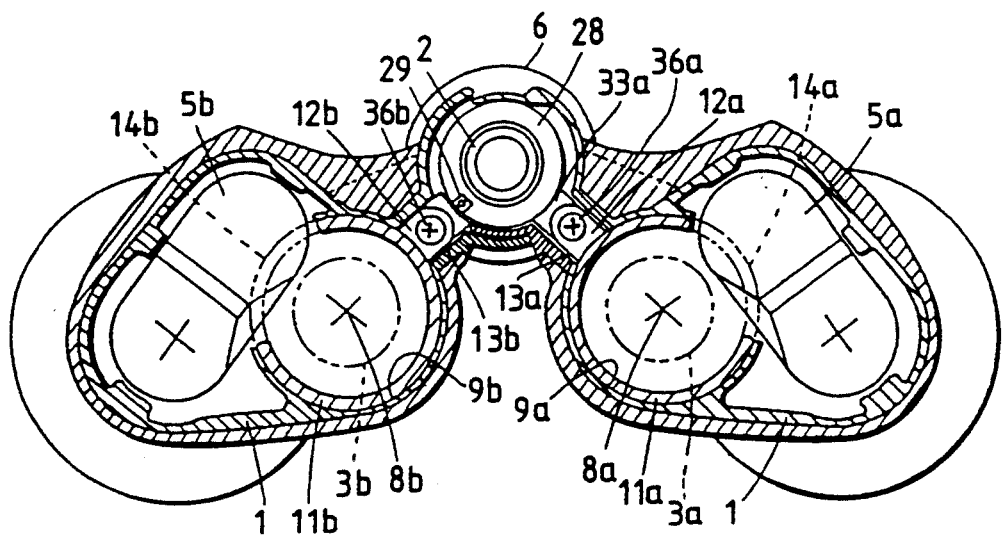
FIG. 2 is a cross-sectional view of the binocular instrument taken along line II—II in FIG. 3

FIG. 1 is a fragmentary cross-sectional view of the binocular instrument showing an important portion thereof. FIG. 2 is a cross-sectional view of the binocular instrument. The binocular body 1 has a pair of guide holes 9a and 9b formed therein and disposed coaxially with the right and left ocular optical axes 8a and 8b, respectively. Each guide hole (9a, 9b) extends from the ocular side to that portion of the binocular body 1 accommodating the Porro prism (5a, 5b). Provided at the inlet portion of the guide hole 9a in a projecting manner is a thin annular wall 10a.

Ocular tubes 11a and 11b are received respectively in the guide hole 9a for sliding movement in the direction of the ocular optical axes 8a and 8b. Each ocular tube (11a, 11b) supports a respective ocular lens (3a, 3b) and has a connecting projection (12a, 12b) formed on its side at its inner end and directed toward the hinge 2. Formed through the wall of each guide hole (9a, 9b) is a slot (13a, 13b) through which the connecting projection (12a, 12b) extends. Each slot (13a, 13b) extends in parallel relation to the ocular optical axis (8a, 8b).

The bottom or inner end of each ocular tube 11a, 11b is partly notched or removed so that it does not interfere with the respective Porro prism (5a, 5b). The notch is indicated by reference numerals 14a and 14b. Thus, in this embodiment, the area or portion of engagement of each ocular tube 11a, 11b, in guide holes 9a, 9b is provided to be sufficiently long within the binocular body 1. and that portion of the ocular tube 11i a, 11b which would interfere with the Porro prism 5a, 5b as a result of such an arrangement is removed.

The ocular lenses 3a, 3b are immovably mounted within one of the right and left ocular tubes 11a and 11b (for example, the left ocular tube 11b) whereas a diopter difference adjusting means 20a is incorporated in the other ocular tube 11a.

As shown in FIG. 1, the diopter difference adjusting means 20a comprises ocular lens frame 21a, eyecup 22a, connecting member 23a and screw 24a. Ocular lens frame 21a supports the ocular lenses 3a and is movable relative to the ocular tube 11a through a threaded connection. Eyecup 22a is made of rubber and connecting member 23a connects eyecup 22a to the ocular lens frame 21a. The connecting member 23a is fixedly secured to the ocular lens frame 21a by a screw 24a. The eyecup 22a is mounted around the connecting member 23a for rotation therewith. With this arrangement, upon rotation of the right eyecup 22a, the ocular lens frame 21a supporting the right ocular lenses 3a is rotated to move forward and backward along the ocular optical axis 8. Thus, the difference between the right and left diopters is adjusted.

Although the diopter difference adjusting means 20a also includes other parts such as a rotation stopper, these parts are omitted from the drawings so that they are not so complicated that the invention is obscured.

The hinge 2 is disposed in parallel relation to the ocular optical axes 8a and 8b and the rotatable wheel 6 is rotatably mounted on the hinge 2. When the rotatable wheel is rotated, an operating shaft 26 threaded on the rotatable wheel 6 is moved axially. The rotatable wheel 6 and the operating shaft 26 jointly constitute a focusing drive means. The rotatable wheel 6 may be replaced by a micromotor or the like.

Wings (connecting members) 27 and 28 are connected to the left and right ocular tubes 11b 11a, respectively. Wings 27 and 28 are fitted on the operating shaft 26 so as to be angularly movable relative to each other.

Therefore, When the binocular body 1 is flexed about the hinge 2, the wings 27 and 28 are angularly moved. More specifically, the right wing 28 is freely rotatable relative to the operating shaft 26 and the left wing 27 is engaged with the operating shaft 26 by engaging portion 29. Thus, left wing 27 serves to limit the rotating of the operating shaft 26. Engaging portion 29 comprises concave and convex portions engaging each other. The operating shaft 26 has a flange 26b formed on the outer periphery at one end. Nut 30 is threaded on the operating shaft 26. The left and right wings 27 and 28 are disposed between the flange 26b and the nut 30 and a washer 31 is interposed between the two wings 27 and 28. A small screw 32 prevents the nut 30 from being loosened.

Figure 4:
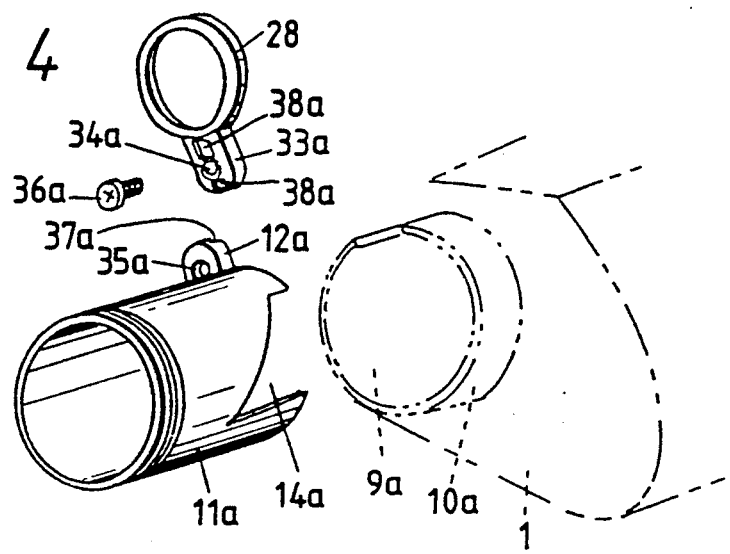
FIG. 4 is a fragmentary, perspective view showing the apparatus for connecting the focusing device to the ocular tubes.

The wings 27 and 28 are connected to the left and right ocular tubes 11b and 11a. respectively. Such connecting portions of the right portion of the binocular instrument will now be described with reference to FIG. 4.

The right wing 28 has an annular body and a connecting arm 33a extending radially outward therefrom and directed toward the ocular tube 11a. The connecting arm 33a overlaps the connecting projection 12a (which is formed on the ocular tube 11a) in the direction of the optical axis. The connecting arm 33a has an internally-threaded hole 34a formed therein, and the connecting projection has a hole 35a formed therethrough which has a diameter greater than the internally-threaded hole 34a, for example, by 0.3 mm. The connecting arm 33a and the connecting projection 12a are fastened together by a fastening screw 36a passing through the hole 35a and threaded into the threaded hole 34a.

The distance between the hinge 2 and the ocular optical axis 8a may vary from one product to another. In this embodiment, however, the connecting projection 12a and the connecting arm 33a can be adjustably displaced with respect to each other in the range of play of the fastening screw 36a relative to the hole 35a. Thus, the position of connecting arm 33a relative to the connecting projection 12a is first suitably adjusted, and then fastened together by the fastening screw 36a to thereby compensate for a variation in the distance between the hinge 2 and the ocular optical axis 8a. After tightening the fastening screw 36a. these connecting portions are firmly connected together and are not subjected to any backlash at all.

Figure 5:
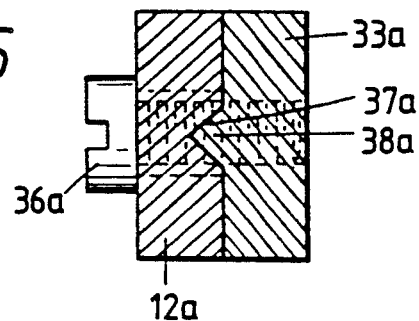
FIG. 5 is a cross-sectional view of the connecting apparatus taken along the line V—V of FIG. 1.
Figure 6:
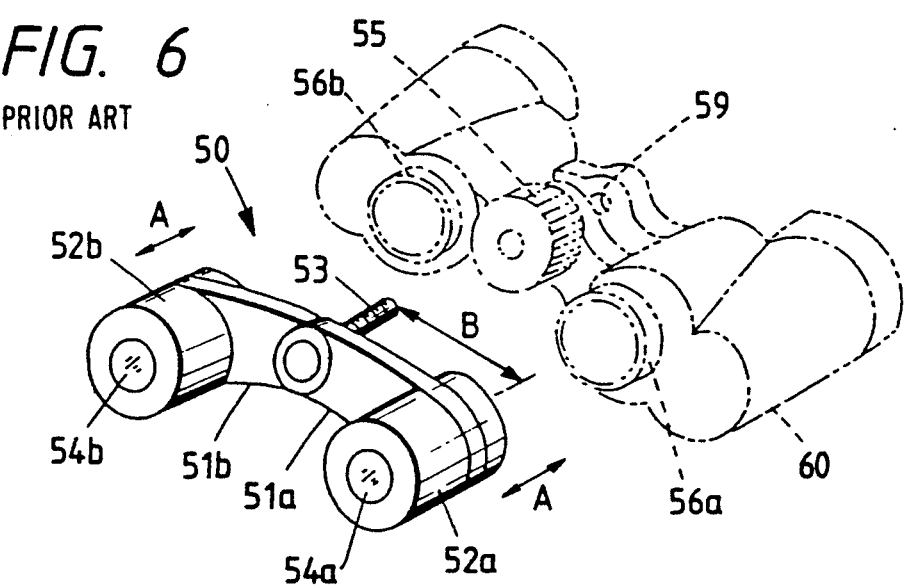
FIG. 6 is a perspective view of a binocular instrument incorporating a focusing device which has been improved upon by the present invention.

As best shown in FIG. 5. the connecting projection 12a has a groove 37a of a V-shaped cross-section formed in one side or face thereof, disposed in contact with the connecting arm 33a. The connecting arm 33a has a protuberance 38a which is formed at one side thereof disposed in contact with the connecting projection 12a and is complementary in shape to the groove 37a. The protuberance 38a is fitted in the groove 37a.

With this arrangement, the connecting projection 12a and the connecting arm 33a are movable relative to each other in the direction of the length of the groove 37a, that is, in the direction of a line connecting the hinge 2 and the ocular optical axis 8a. Therefore, the connecting projection 12a and the connecting arm 33a can be slidingly moved relative to each other so as to properly adjust the distance between the hinge 2 and the ocular optical axis 8a. After this adjustment has been made, the connecting projection 12a and the connecting arm 33a are fastened together by the screw 36a. The protuberance 38a and the groove 37a also serve as a rotation prevention means for preventing the connecting projection 12a and the connecting arm 33a from rotating relative to each other in the direction of rotation of the fastening screw 36a. Therefore, when the fastening screw 36a is being tightened, the connecting projection 12a and the connecting arm 33a are not rotated in response to the tightening of the fastening screw 36a. Therefore, the connection is maintained between the projection 12a and the arm 33a along a linear line. Thus, the connecting projection 12a and the connecting arm 33a which are connected together will not be disposed angularly with respect to each other, and they are oriented in a predetermined direction and are kept in a predetermined relative position, so that the connecting projection 12a is not being firmly pressed against the wall of the slot 13a. Therefore, the connecting projection 12a and the connecting arm 33a can be smoothly moved when effecting the focusing operation.

In the above embodiment, when the rotatable wheel 6 is rotated, the operating shaft 26 slides axially. so that the wings 27 and 28 slide together with the operating shaft 26. As a result, the ocular tubes 11b and 11a connected respectively to the wings 27 and 28 through the connecting projections (12b, 12a) and the connecting arms (33b, 33a) are slidingly moved along the respective ocular optical axes (8b, 8a) to thereby achieve focusing. In any operating condition, the operating shaft 26, the wings 27 and 28, the connecting projections 12b, 12a and the connecting arms 33b, 33a, are always disposed within the binocular body 1 and are not exposed to the exterior.

As described above, in the focusing device for a binocular instrument according to the present invention, each ocular tube 11a, 11b supporting the ocular lenses 3a, 3b is received in a respective guide hole 9a, 9b formed in the binocular body 1. Therefore, the binocular instrument does not become large in size. Moreover the area of engagement (fitting) between the ocular tubes 11a, 11b and the guide holes 9a, 9b can be sufficiently long. Therefore, the ocular portion is free from movement due to play or backlash, so that a good view of an object can always be obtained.

Even if there is a variation in the distance between the focusing drive means and the ocular tube 11a or 11b. they can be firmly connected together by the fastening screw 36a or 36b without any play through the connecting portions 33a, 33b focusing drive means and the ocular tube. Therefore, the ocular lenses cannot be accidentally moved or displaced, so that a good view of an object can always be obtained. In addition, because of the provision of the rotation prevention means, the connecting portions 33a, 33b and 12a, 12b are not rotated in response to the tightening of the fastening screw 36a, 36b. Therefore, the connecting portions 33a, 33b and 12a, 12b are oriented in the predetermined direction and are kept in the predetermined relative position. This ensures a good focusing operation.

As described above, each ocular tube 11a, 11b is fitted in the respective guide hole 9a, 9b formed in the binocular body 1, and the connecting means for connecting the focusing drive means and the ocular tube 11a, 11b together is accommodated within the binocular body 1. Therefore, the operating portion for effectign focusing is not exposed to the exterior. Thus, dust, dirt and the like will not be deposited on the operating portion of the binocular instrument. Also, even when the binocular instrument is inadvertently dropped and is subjected to a great impact, the operating portion for effecting focusing cannot be easily damaged, thus creating excellent durabiliyt.

Further, since the operating portion is not exposed to the exterior, the binocular can have a simple appearance and design.

What is claimed is:

1. A binocular instrument comprising:
   a binocular body;
   a pair of right and left ocular lenses;
   a single focusing drive means provided between the right and left ocular lenses for simultaneously moving the right and left ocular lenses forward and backward in a direction of an optical axis to effect focusing;
   a pair of right and left guide holes formed in said body extending inwardly from an ocular side end of said body, the guide holes extending in coaxial relation to respective ocular optical axes, and a wall of each of the guide holes having a slot, formed parallel to a respective one of said ocular optical axes, through which each of right and left connecting means extends;
   a pair of right and left ocular tubes respectively supporting said ocular lenses and being received respectively in the guide holes to as to be slidable along the respective ocular optical axes; and
   said right and left connecting means for connecting each of the ocular tubes to said focusing drive means.

2. A binocular instrument according to claim 1, further comprising a pair of Porro prisms or Porro mirrors mounted within the binocular body and disposed between the right ocular lens and the right objective lens and between the left ocular lens and the left objective lens, respectively.

3. A binocular instrument according ot claim 2, wherein a portion of the ocular tube which would interfere with the Porro prism or Porro mirror is removed.

4. A binocular instrument according to claim 3, wherein at least one of the right and left ocular tubes has a diopter difference adjusting means for moving the respective ocular lens supported by said at least one ocular tube forward and backward in a direction of the optical axis.

5. A binocular instrument according to claim 1, wherein at least one of the right and left ocular tubes has a diopter difference adjusting means for moving the respective ocular lens supported by said at least one ocular tube forward and backward in a direction of the optical axis.

6. A binocular instrument according to claim 1, wherein said right and left connecting means are mounted on a central hinge within the binocular body and angularly movable relative to each other about the hinge.

7. A focusing device for a binocular instrument comprising a single focusing drive means provided between right and left ocular tubes which respectively support ocular lenses, for simultaneously moving the ocular tubes forward and backward in a direction of an optical axis to effect focusing, said focusing device comprising:
   connecting portions projecting from the sides of said focusing drive means and each of the ocular tubes in overlapping relation to each other;
   fastening means for fastening together said connecting portions; and rotation prevention means for preventing the connecting portions from rotating relative to each other about said fastening means.

8. A focusing device according to claim 7, wherein said fastening means is a screw.

9. A focusing device according to claim 7, wherein one of the connecting portions has a groove formed therein which extends in a direction of projection of said one connecting portion, another of said connecting portions having a protuberance formed thereon and received in said groove, said groove and said protuberance jointly providing said rotation prevention means.

10. A focusing device according to claim 7, wherein said connecting portions are mounted on a central hinge within a binocular body and angularly movable relative to each other about the hinge.

11. A focusing device for a binocular instrument comprising a single focusing drive means provided between right and left ocular tubes which respectively support ocular lenses, for simultaneously moving the ocular tubes foward and backward in a direction of an optical axis to effect focusing, said focusing device comprising:

connecting portions projecting from the sides of said focusing drive means and each of the ocular tubes in overlapping relation to each other;

fastening means for fastening together said connecting portions; and means for changing a degree of overlapping relation of said connecting portions.

* * * * *